(12) United States Patent
Nair et al.

(10) Patent No.: US 8,543,615 B1
(45) Date of Patent: Sep. 24, 2013

(54) AUCTION-BASED SERVICE SELECTION

(75) Inventors: Manoj Nair, Cary, NC (US); Stephen R Perrin, Chapel Hill, NC (US); Iva Blazina Vukelja, Everett, MA (US); John Philip Bell, II, Skibbereen (IE); Alex Rankov, Danville, CA (US)

(73) Assignee: EMC Corporation, Hopkinton, MA (US)

(*) Notice: Subject to any disclaimer, the term of this patent is extended or adjusted under 35 U.S.C. 154(b) by 626 days.

(21) Appl. No.: 11/694,764

(22) Filed: Mar. 30, 2007

Related U.S. Application Data

(60) Provisional application No. 60/826,072, filed on Sep. 18, 2006, provisional application No. 60/826,073, filed on Sep. 18, 2006, provisional application No. 60/826,053, filed on Sep. 18, 2006, provisional application No. 60/826,074, filed on Sep. 18, 2006, provisional application No. 60/826,042, filed on Sep. 18, 2006.

(51) Int. Cl.
*G06F 17/30* (2006.01)

(52) U.S. Cl.
USPC ............................ 707/802; 709/223; 718/104

(58) Field of Classification Search
USPC ............. 705/1; 709/223–226; 718/104–105; 707/802
See application file for complete search history.

(56) References Cited

U.S. PATENT DOCUMENTS

| | | | |
|---|---|---|---|
| 6,003,040 A | 12/1999 | Mital et al. |
| 6,167,445 A | 12/2000 | Gai et al. |
| 6,308,216 B1 | 10/2001 | Goldszmidt et al. |
| 6,349,297 B1 | 2/2002 | Shaw et al. |
| 6,363,053 B1 | 3/2002 | Schuster et al. |
| 6,430,613 B1 | 8/2002 | Brunet et al. |
| 6,591,300 B1 | 7/2003 | Yurkovic |
| 6,633,312 B1 | 10/2003 | Rochford et al. |
| 6,865,728 B1 | 3/2005 | Branson et al. |
| 7,185,073 B1 | 2/2007 | Gai et al. |
| 7,240,076 B2 | 7/2007 | McCauley et al. |
| 7,278,156 B2 | 10/2007 | Mei et al. |
| 7,363,292 B2 | 4/2008 | Chaboche |
| 7,543,020 B2 | 6/2009 | Walker et al. |

(Continued)

FOREIGN PATENT DOCUMENTS

WO  WO 2008/036621  3/2008

OTHER PUBLICATIONS

U.S. Appl. No. 11/528,783, Mail Date Feb. 24, 2009, Office Action.

(Continued)

*Primary Examiner* — Huawen Peng
(74) *Attorney, Agent, or Firm* — Workman Nydegger

(57) ABSTRACT

A method and system for locating a service provider capable of providing service level objectives for a data object stored within a computer system. The computer system includes an information management service for providing customized services to data objects residing in the computer system. One exemplary method identifies a data object such as a file, folder or database that is associated with service level objectives. Service level objectives may include services that can be provided to the data object. The method also identifies at least one service provider located within the computer system. An information management service request is sent to the service providers containing the service level objectives associated with the data object. Responses are then received from the service providers including which of the service level objectives the service providers are capable of providing to the data object.

20 Claims, 8 Drawing Sheets

(56) References Cited

U.S. PATENT DOCUMENTS

| | | | |
|---|---|---|---|
| 7,548,915 B2 | 6/2009 | Ramer et al. | |
| 7,565,656 B2* | 7/2009 | Yamasaki et al. | 718/104 |
| 7,580,357 B2 | 8/2009 | Chang et al. | |
| 7,613,806 B2 | 11/2009 | Wright et al. | |
| 7,616,642 B2 | 11/2009 | Anke et al. | |
| 7,725,570 B1 | 5/2010 | Lewis | |
| 7,725,571 B1 | 5/2010 | Lewis | |
| 7,730,172 B1 | 6/2010 | Lewis | |
| 7,734,765 B2 | 6/2010 | Musman et al. | |
| 7,739,239 B1 | 6/2010 | Cormie et al. | |
| 7,895,220 B2 | 2/2011 | Evans et al. | |
| 7,953,740 B1 | 5/2011 | Vadon et al. | |
| 8,104,080 B2 | 1/2012 | Burns et al. | |
| 2002/0016800 A1 | 2/2002 | Spivak et al. | |
| 2002/0091746 A1 | 7/2002 | Umberger et al. | |
| 2002/0161883 A1 | 10/2002 | Matheny et al. | |
| 2003/0023587 A1 | 1/2003 | Dennis et al. | |
| 2003/0023712 A1 | 1/2003 | Zhao et al. | |
| 2003/0036886 A1 | 2/2003 | Stone | |
| 2003/0041050 A1 | 2/2003 | Smith et al. | |
| 2003/0093528 A1 | 5/2003 | Rolia | |
| 2003/0140009 A1 | 7/2003 | Namba et al. | |
| 2003/0167180 A1* | 9/2003 | Chung et al. | 705/1 |
| 2003/0196108 A1 | 10/2003 | Kung | |
| 2003/0212778 A1 | 11/2003 | Collomb | |
| 2003/0225829 A1 | 12/2003 | Pena et al. | |
| 2003/0233391 A1 | 12/2003 | Crawford et al. | |
| 2003/0233464 A1 | 12/2003 | Walpole et al. | |
| 2003/0236904 A1 | 12/2003 | Walpole et al. | |
| 2004/0060002 A1 | 3/2004 | Lucovsky et al. | |
| 2004/0098415 A1 | 5/2004 | Bone et al. | |
| 2004/0215650 A1 | 10/2004 | Shaji et al. | |
| 2004/0243699 A1 | 12/2004 | Koclanes et al. | |
| 2005/0060662 A1 | 3/2005 | Soares et al. | |
| 2005/0071182 A1 | 3/2005 | Aikens et al. | |
| 2005/0125768 A1 | 6/2005 | Wong et al. | |
| 2005/0131982 A1 | 6/2005 | Yamasaki et al. | |
| 2005/0132034 A1 | 6/2005 | Iglesia et al. | |
| 2005/0177545 A1 | 8/2005 | Buco et al. | |
| 2005/0197852 A1 | 9/2005 | Gebhard et al. | |
| 2005/0251533 A1 | 11/2005 | Harken et al. | |
| 2005/0262097 A1 | 11/2005 | Sim-Tang et al. | |
| 2005/0273451 A1 | 12/2005 | Clark et al. | |
| 2006/0015388 A1 | 1/2006 | Flockhart et al. | |
| 2006/0036463 A1 | 2/2006 | Patrick et al. | |
| 2006/0092861 A1 | 5/2006 | Corday et al. | |
| 2006/0095543 A1 | 5/2006 | Ito et al. | |
| 2006/0101084 A1 | 5/2006 | Kishi et al. | |
| 2006/0106782 A1 | 5/2006 | Blumenau et al. | |
| 2006/0112108 A1 | 5/2006 | Eklund et al. | |
| 2006/0114832 A1 | 6/2006 | Hamilton et al. | |
| 2006/0129974 A1 | 6/2006 | Brendle et al. | |
| 2006/0179143 A1 | 8/2006 | Walker et al. | |
| 2006/0236061 A1 | 10/2006 | Koclanes | |
| 2006/0248165 A1 | 11/2006 | Sridhar et al. | |
| 2006/0248187 A1 | 11/2006 | Thorpe et al. | |
| 2007/0038683 A1 | 2/2007 | Dixon et al. | |
| 2007/0055689 A1 | 3/2007 | Rhoads et al. | |
| 2007/0058632 A1 | 3/2007 | Back et al. | |
| 2007/0061363 A1 | 3/2007 | Ramer et al. | |
| 2007/0070894 A1 | 3/2007 | Wang et al. | |
| 2007/0083875 A1 | 4/2007 | Jennings | |
| 2007/0103984 A1 | 5/2007 | Kavuri et al. | |
| 2007/0104208 A1 | 5/2007 | Svensson | |
| 2007/0127370 A1 | 6/2007 | Chang et al. | |
| 2007/0153802 A1 | 7/2007 | Anke et al. | |
| 2007/0192352 A1 | 8/2007 | Levy | |
| 2007/0208751 A1 | 9/2007 | Cowan et al. | |
| 2007/0214208 A1 | 9/2007 | Balachandran | |
| 2007/0226228 A1 | 9/2007 | Her et al. | |
| 2007/0294406 A1 | 12/2007 | Suer et al. | |
| 2007/0299828 A1 | 12/2007 | Lewis et al. | |
| 2008/0002678 A1 | 1/2008 | Klessig et al. | |
| 2008/0005086 A1 | 1/2008 | Moore | |
| 2008/0021850 A1 | 1/2008 | Irle et al. | |
| 2008/0049642 A1 | 2/2008 | Gudipudi et al. | |
| 2008/0059387 A1 | 3/2008 | Vaidhyanathan et al. | |
| 2008/0071726 A1 | 3/2008 | Nair et al. | |
| 2008/0071727 A1 | 3/2008 | Nair et al. | |
| 2008/0071813 A1 | 3/2008 | Nair et al. | |
| 2008/0071908 A1 | 3/2008 | Nair et al. | |
| 2008/0077682 A1 | 3/2008 | Nair et al. | |
| 2008/0077995 A1 | 3/2008 | Curnyn et al. | |
| 2008/0097923 A1 | 4/2008 | Kim et al. | |
| 2008/0114725 A1 | 5/2008 | Indeck et al. | |
| 2008/0134043 A1 | 6/2008 | Georgis et al. | |
| 2008/0177994 A1 | 7/2008 | Mayer | |
| 2008/0301760 A1 | 12/2008 | Lim | |
| 2009/0077210 A1 | 3/2009 | Musman et al. | |
| 2009/0150431 A1 | 6/2009 | Schmidt et al. | |
| 2009/0157881 A1 | 6/2009 | Kavuri et al. | |

OTHER PUBLICATIONS

U.S. Appl. No. 11/528,898, Mail Date Feb. 9, 2009, First Action Interview.
U.S. Appl. No. 11/528,898, Mail Date Apr. 3, 2009, Office Action.
U.S. Appl. No. 11/528,900, Mail Date Jan. 23, 2009, Final Office Action.
U.S. Appl. No. 11/694,753, Mail Date Mar. 25, 2009, Office Action.
U.S. Appl. No. 11/694,783, Mail Date Feb. 6, 2009, Office Action.
U.S. Appl. No. 11/692,051, filed Mar. 27, 2007, Perrin et al.
U.S. Appl. No. 11/692,058, filed Mar. 27, 2007, Perrin et al.
U.S. Appl. No. 11/694,753, filed Mar. 30, 2007, Nair et al.
U.S. Appl. No. 11/694,753, filed Mar. 30, 2007, Perrin et al.
U.S. Appl. No. 11/772,179, filed Jun. 30, 2007, John Philip Bell, II.
U.S. Appl. No. 11/772,192, filed Jun. 30, 2007, Nair et al.
U.S. Appl. No. 11/528,900, Mail Date Jun. 9, 2008, Office Action.
U.S. Appl. No. 11/528,772, Mail Date Jun. 3, 2009, Final Office Action.
U.S. Appl. No. 11/528,783, Mail Date Jun. 25, 2009, Final Office Action.
U.S. Appl. No. 11/528,900, Mail Date Aug. 25, 2009, Notice of Allowance.
U.S. Appl. No. 11/692,058, Mail Date Jul. 9, 2009, Office Action.
U.S. Appl. No. 11/692,051, Mail Date Aug. 26, 2009, Office Action.
U.S. Appl. No. 11/772,179, Mail Date Aug. 19, 2009, Office Action.
U.S. Appl. No. 11/528,772, Mail Date Sep. 12, 2008, Pre-Interview First Office Action.
U.S. Appl. No. 11/528,783, Mail Date Nov. 7, 2008, Pre-Interview First Office Action.
U.S. Appl. No. 11/528,898, Mail Date Sep. 5, 2008, Pre-Interview First Office Action.
U.S. Appl. No. 11/528,898, Mail Date Oct. 7, 2009, Final Office Action.
U.S. Appl. No. 11/694,753, Mail Date Nov. 18, 2009, Final Office Action.
U.S. Appl. No. 11/864,596, filed Sep. 28, 2007, Nair et al.
U.S. Appl. No. 11/864,605, filed Sep. 28, 2007, Nair et al.
U.S. Appl. No. 11/864,770, filed Sep. 28, 2007, Nair et al.
U.S. Appl. No. 11/864,774, filed Sep. 28, 2007, Nair et al.
U.S. Appl. No. 11/864,760, filed Sep. 28, 2007, Nair et al.
U.S. Appl. No. 11/864,764, filed Sep. 28, 2007, Nair et al.
U.S. Appl. No. 11/528,783, Mail Date Jan. 15, 2010, Office Action.
U.S. Appl. No. 11/692,058, Mail Date Jan. 8, 2010, Final Office Action.
U.S. Appl. No. 11/864,596, Mail Date Nov. 12, 2009, Office Action.
U.S. Appl. No. 11/864,770, Mail Date Nov. 27, 2009, Office Action.
U.S. Appl. No. 11/864,760, Mail Date Nov. 24, 2009, Office Action.
U.S. Appl. No. 11/864,605, Mail Date Jan. 14, 2010, Office Action.
U.S. Appl. No. 11/528,772, Mail Date Jan. 28, 2010, Office Action.
U.S. Appl. No. 11/694,753, Mail Date Mar. 29, 2010, Office Action.
U.S. Appl. No. 11/692,051, Mail Date Feb. 19, 2010, Notice of Allowance.
U.S. Appl. No. 11/692,051, Mail Date, Mar. 31, 2010, Notice of Allowance.
U.S. Appl. No. 11/772,179, Mail Date Feb. 23, 2010, Final Office Action.

U.S. Appl. No. 11/864,770, Mail Date Apr. 21, 2010, Final Office Action.
U.S. Appl. No. 11/772,192, Mail Date Apr. 15, 2010, Office Action.
U.S. Appl. No. 11/864,760, Mail Date Apr. 7, 2010, Final Office Action.
U.S. Appl. No. 11/528,772, Mail Date Aug. 10, 2010, Final Office Action.
U.S. Appl. No. 11/528,783, Mail Date Sep. 1, 2010, Final Office Action.
U.S. Appl. No. 11/528,790, Mail Date Jul. 12, 2010, Office Action.
U.S. Appl. No. 11/692,058, Mail Date Jul. 6, 2010, Office Action.
U.S. Appl. No. 11/694,753, Mail Date Oct. 5, 2010, Final Office Action.
U.S. Appl. No. 11/772,192, Mail Date Oct. 29, 2010, Final Office Action.
U.S. Appl. No. 11/864,596, Mail Date May 26, 2010, Final Office Action.
U.S. Appl. No. 11/864,605, Mail Date May 28, 2010, Final Office Action.
U.S. Appl. No. 11/864,605, Mail Date Nov. 4, 2010, Office Action.
U.S. Appl. No. 11/864,760, Mail Date Jul. 27, 2010, Office Action.
U.S. Appl. No. 11/864,770, Mail Date Nov. 3, 2010, Office Action.
U.S. Appl. No. 11/694,753, Mail Date Jun. 17, 2011, Final Office Action.
U.S. Appl. No. 11/864,774, Mail Date May 11, 2011, Office Action.
U.S. Appl. No. 11/528,772, Mail Date Mar. 3, 2011, Office Action.
U.S. Appl. No. 11/528,790, Mail Date Jan. 13, 2011, Final Office Action.
U.S. Appl. No. 11/692,058, Mail Date Jan. 24, 2011, Notice of Allowance.
U.S. Appl. No. 11/694,753, Mail Date Jan. 19, 2011, Office Action.
U.S. Appl. No. 11/864,596, Mail Date Mar. 11, 2011, Office Action.
U.S. Appl. No. 11/864,605, Mail Date Mar. 9, 2011, Final Office Action.
U.S. Appl. No. 11/864,760, Mail Date Jan. 27, 2011, Final Office Action.
U.S. Appl. No. 11/864,764, Mail Date Jan. 27, 2011, Office Action.
U.S. Appl. No. 11/528,772, Mail Date Oct. 27, 2011, Notice of Allowance.
U.S. Appl. No. 11/528,790, Mail Date Jan. 23, 2012, Office Action.
U.S. Appl. No. 11/694,753, Mail Date Jan. 26, 2012, Office Action.
U.S. Appl. No. 11/772,192, Mail Date Jan. 5, 2012, Office Action.
U.S. Appl. No. 11/864,596, Mail Date Oct. 7, 2011, Final Office Action.
U.S. Appl. No. 11/864,770, Mail Date Apr. 19, 2011, Final Office Action.
U.S. Appl. No. 11/864,764, Mail Date Aug. 29, 2011, Final Office Action.
U.S. Appl. No. 11/864,774, Mail Date Dec. 9, 2011, Final Office Action.
U.S. Appl. No. 13/414,512, filed Mar. 7, 2012, Nair et al.
U.S. Appl. No. 11/528,783, Mail Date Feb. 14, 2012, Office Action.
U.S. Appl. No. 11/528,898, Mail Date Mar. 1, 2012, Office Action.
U.S. Appl. No. 11/772,179, Mail Date Mar. 29, 2012, Office Action.
U.S. Appl. No. 11/864,764, Mail Date May 3, 2012, Office Action.
U.S. Appl. No. 11/528,783, Mail Date Aug. 15, 2012, Final Office Action.
U.S. Appl. No. 11/528,790, Mail Date Jul. 18, 2012, Final Office Action.
U.S. Appl. No. 11/694,753, Mail Date Nov. 30, 2012, Notice of Allowance.
U.S. Appl. No. 11/772,192, Mail Date Jun. 12, 2012, Final Office Action.
U.S. Appl. No. 11/864,605, Mail Date Jul. 3, 2012, Office Action.
U.S. Appl. No. 11/528,898, Mail Date Oct. 2, 2012, Final Office Action.
U.S. Appl. No. 11/694,753, Mail Date Aug. 31, 2012, Notice of Allowance.
U.S. Appl. No. 11/772,179, Mail Date Nov. 13, 2012, Final Office Action.
U.S. Appl. No. 11/864,605, Mail Date Nov. 8, 2012, Final Office Action.
U.S. Appl. No. 11/864,770, Mail Date Feb. 4, 2013, Office Action.
U.S. Appl. No. 11/864,764, Mail Date Dec. 10, 2012, Final Office Action.
Ben-Ghorbel-Talbi et al.; "An Extended Role-Based Access Control Model for Delegating Obligations"; Springer-Verlag Berline Heidelberg 2009.
Belokosztolszki et al.; "Meta-Policies for Distributed Role-Based Access Control Systems"; 2002 IEEE.
U.S. Appl. No. 11/528,790, Mailed Jun. 17, 2013, Office Action.
U.S. Appl. No. 11/772,192, Mailed Aug. 12, 2013, Notice of Allowance.
U.S. Appl. No. 11/864,605, Mailed May 24, 2013, Notice of Allowance.
U.S. Appl. No. 11/864,770, Mailed Jun. 13, 2013, Final Office Action.
U.S. Appl. No. 13/414,512, Mailed Aug. 1, 2013, Office Action.

* cited by examiner

AUCTION-BASED SERVICE SELECTION

CROSS-REFERENCE TO RELATED APPLICATIONS

This application claims the benefit of:

U.S. Provisional Application Ser. No. 60/826,072, filed Sep. 18, 2006 and entitled "INFORMATION MANAGEMENT";

U.S. Provisional Application Ser. No. 60/826,073, filed Sep. 18, 2006 and entitled "CASCADED DISCOVERY OF INFORMATION ENVIRONMENT";

U.S. Provisional Application Ser. No. 60/826,053, filed Sep. 18, 2006, entitled "ENVIRONMENT CLASSIFICATION";

U.S. Provisional Application Ser. No. 60/826,074, filed Sep. 18, 2006 and entitled "INFORMATION CLASSIFICATION"; and U.S. Provisional Application No. 60/826,042, filed Sep. 18, 2006, entitled "SERVICE LEVEL MAPPING METHOD";

which applications are incorporated herein by reference in their entirety.

BACKGROUND

1. The Field of the Invention

The present invention relates generally to information management services. More specifically, the present invention relates to methods and systems for performing auction based service selection to find service providers that are best capable of providing service level objectives to files.

2. The Relevant Technology

Modern computer systems allow for the interchange of data and resources through network environments. For example, a modern computer network may include a number of interconnected client computers. The computer network may further include resources such as file servers for storing data accessible by the clients, print servers for providing access to printers to the clients, or shared stores on client computers for storing data to be made available to other clients and resources on the network.

In this society where many personal and business interactions are data driven, the ability to provide protection, retention, recovery, security, and other services to data have become important features of computer networks. Establishing a system to provide these services can be costly, both in terms of the equipment and applications necessary to perform the services and particularly in terms of the time required to configure and manage the system. As the amount of data stored by a system increases and the storage systems become more complex, the ability to customize the services provided to each data file is of greater importance.

The subject matter claimed herein is not limited to embodiments that solve any disadvantages or that operate only in environments such as those described above. Rather, this background is only provided to illustrate one exemplary technology area where some embodiments described herein may be practiced.

BRIEF DESCRIPTION OF THE DRAWINGS

To further clarify the features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
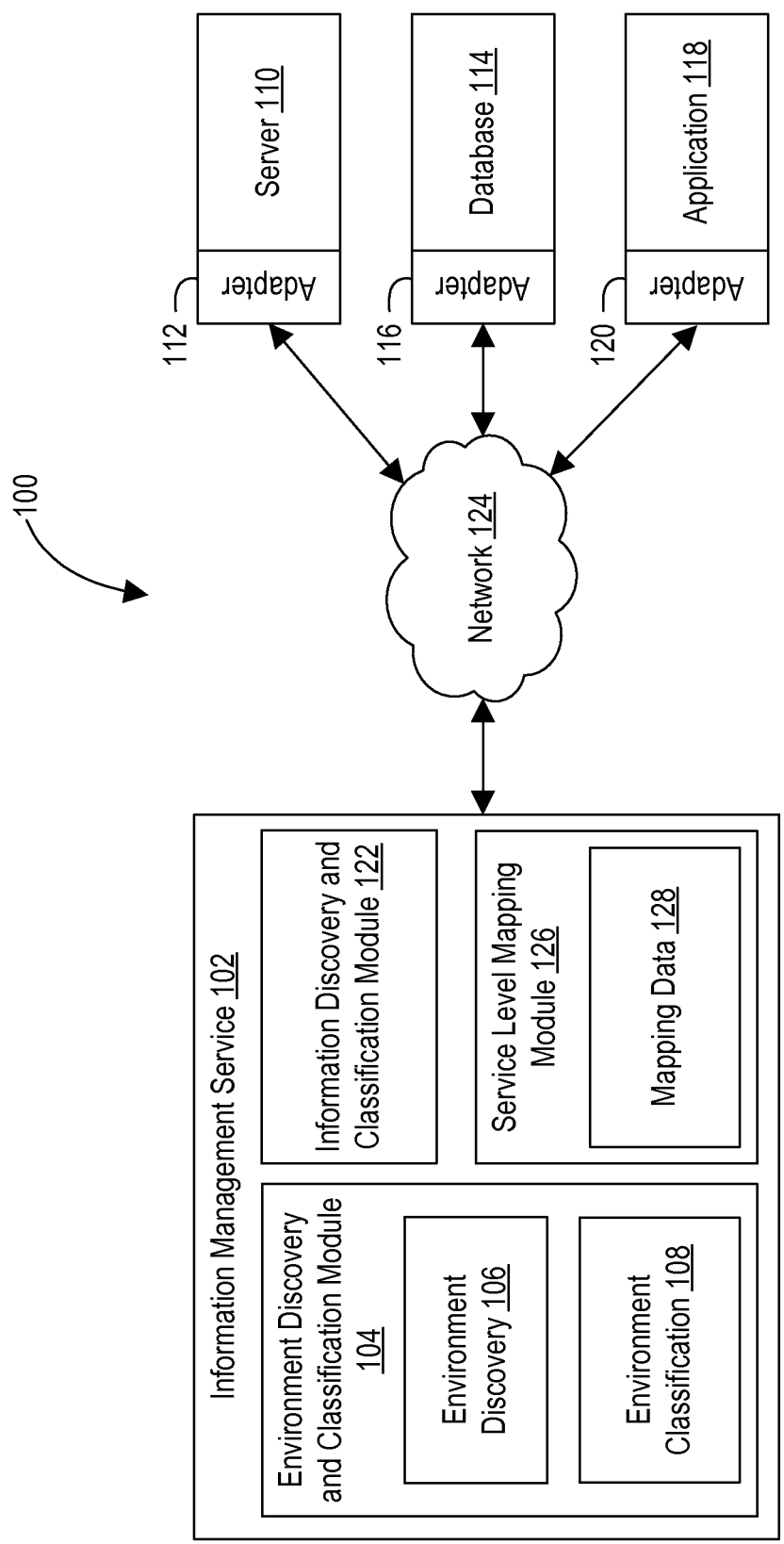
FIG. 1 illustrates a computer system having an information management service configured for classifying the environment components of the computer system, in accordance with the present invention.

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Embodiments of the present invention relate to methods and systems for locating a service provider capable of providing or identifying service level objectives for a data object stored within a computer system. The computer system includes an information management server for providing customized services to data objects residing in the computer system. One exemplary method identifies a data object, such as a file, folder, database, and the like, that is associated with at least one service level objective. Service level objectives may include any type of service area or service level that can be provided to a data object, including data backup, data retention, data indexing, lifecycle management, and the like, as is described in further detail herein. The method also identifies at least one service provider located within the computer system. An information management service request is sent to the service providers containing the service level objectives associated with the data object. Responses are then received from the service providers including which of the service level objectives the service providers are capable of providing to the data object.

As used herein, the terms "data" and "data object" may include, but are not limited to, files, directories (e.g., volumes, file systems, and the like), user data, system data, applications, services, operating systems, instructions, and the like, that can be stored on one or more storage devices. Backing up or recovering the data may include backing up or recovering any of the data herein defined or understood by those of skill in the art. Data may be organized in logical directories that do not necessarily correspond to a particular storage device. The term "directory" can be used interchangeably with the term "volume" or "file system" to refer to any means of logically organizing data on a computer.

Certain embodiments described herein will involve electronic communication between a client computer system (hereinafter referred to as a "client") requesting access to a network service at a server computer system (hereinafter referred to as a "server"). Accordingly, the client sends a request to the server for particular access to its system resources, wherein if the client is authorized and validated, the server responds with a response message providing the desired information. Of course, other messaging patterns between client and server are available, as are well known in the art.

It should be appreciated that the present invention can be implemented in numerous ways, including as a process, an apparatus, a system, a device, a method, or a computer-readable medium such as a computer-readable storage medium or a computer network wherein program instructions are sent over optical or electronic communication links. A general purpose computer system such as an Intel-based processor running Microsoft Windows or Linux may be used, or a specialized appliance may be used.

1. Introduction to Information Management Services

Embodiments of the invention relate to information or data management. Information management enables the orchestration of services such as data protection, data placement, corporate compliance, and others based on the needs of the underlying data and the value of the data to the owner of the data. Embodiments of the invention enable the data to be classified in an automated fashion and provide various levels of granularity that can be adjusted as needed. Using the techniques described herein, an entity can be assured that its data is receiving the services that are actually required. The following introduction provides context for the present invention, which focuses on service level mapping used for facilitating the orchestration of customized service levels.

Referring to FIG. 1, a computer system 100 is illustrated having various environment components, including a server 110, a database 114, and an application 118. The computer system 100 may include a single computer, a local area network (LAN), metropolitan area networks (MAN), a wide area network (WAN), and the like and combinations thereof. The environment components 110, 114 and 118 and the information management service 102 may be located locally or at a remote location in relation to the clients utilizing the information management service 102.

An information management service 102 may be configured to provide various services, including but not limited to, an information discovery and classification module 122, an environment discovery and classification module 104, a service level mapping module 126, and the like. The information residing in the computer system 100 is discovered and classified by the information discovery and classification module 122. The environment components 110, 114 and 118 that exist within the computer system 100 are discovered and classified by the environment discovery and classification module 104. The service level mapping module 126 is then used for matching the discovered data objects to their service needs, and for the matching their service needs to the appropriate service provider (i.e., environment component) that is capable of providing those needs. Each of the modules 104, 122 and 126 will be described in further detail below, with particular emphasis placed on the service level mapping module 126.

As described previously, the environment discovery and classification module 104 is provided for discovering and for classifying the environment components 110, 114, and 118 that exist within the computer system 100. Although only three environment components are illustrated in FIG. 1, more or less environment components may exist within the computer system 100.

The environment components 110, 114, and 118 may provide a variety of services to the computer system 100 and to the data residing therein. For example, the server 110 may act as a storage server, retention server, data migration server, backup server, recovery server, data protection server, and the like or any combination thereof. The database 114, for example, may act as an exchange database, a payroll database, and the like or any combination thereof. The application 118 may include, for example, a data indexer, a data miner, a data transport, a security application, and the like or any combination thereof a. Information Discovery and Classification A large variety of data objects may be stored within the computer system 100. The data objects may be discovered by the information discovery and classification module 122. The discovered data objects may have a variety of service needs. The service level objectives requested by a data object may be characterized by set of a service areas and a set of service levels. Service areas include generalized areas of service that may be performed on a data object, including data protection (e.g., frequency of backup, redundancy of data, and the like), data retention, data security (e.g., encryption, access control, and the like), data migration, data indexing, and the like. Service levels define the extent at which a service area is provided to the data object. For example, a service area may include data backup. Data backup may include various service levels, including an hourly backup, a daily backup, a weekly backup, a monthly backup, and the like.

The services required by each of the data objects may be imposed by the system administrator, governmental standards and regulations, company guidelines, and the like or any combination thereof. A single data object may require multiple services from more than one service area. The combination of services requested by a single data object is referred to herein as a "target service package."

A large computer system, such as an enterprise network, may include a large variety of data objects having various unique properties. Consequently, the data objects within a computer system may also request many different service level objectives. By way of example, certain data objects must be retained for one year, while other types of data objects must be retained indefinitely. Likewise, certain data objects must be indexed, while indexing is not necessary or may be overly expensive or may waste valuable resources when performed for other types of data objects. In addition, certain data objects must be saved to a backup location at least once per day, while other types of data objects only need to be saved to the backup location once every week. Within a company or enterprise network, documents created by one division within the company may require a higher or different level of service than documents created by another division within the company. Furthermore, documents containing predefined words, phrases, or data patterns may require higher or different levels of service than other types of documents. Other examples of differing service areas and differing service levels required by data within the system will also be evident to one of ordinary skill in the art.

In order to efficiently determine the service level objectives of each data object residing in the computer system 100, the data objects may be classified using the information discovery and classification module 122. In general, the information discovery and classification module 122 may perform an automated classification process, which may classify the data objects in accordance with a predefined set of rules. The data objects may be classified based on a number of factors, including the content contained within each data object, the organization, group or individual that created the data object, the metadata associated with each data object, and the like and any combination thereof. The metadata may be used to determine the date of last use of the data object, owner of the data object, date of creation, file size, file type, disposition date, content of the object, and the like.

b. Environment Discovery and Classification

Environment components 110, 114, or 118 are often limited as to the service areas and service levels that they are capable of providing. For example, the server 110 may be capable of providing a low level of security services for certain data files that do not require a high level of security, but the server 110 may be incapable of providing high level security services to highly confidential files. Therefore, it may be advantageous to classify the environment components in accordance with the service areas and service levels that each environment component is capable of providing.

Classifying the environment of the computer system 100 may be performed by the environment discovery and classification module 104. First, the system environment is discovered, and second, the discovered environment components are classified in accordance with their service level capabilities. In general, the environment discovery module 106 may create a detailed diagram or other representation of each environment component 110, 114, 118 contained within the computer system 100, as well as the manner in which each environment component interfaces with the other environment components and subsystems within the computer system 100. In order to create a detailed diagram, the environment discovery module 104 may rely on adapters 112, 116, and 120 that are specifically configured to communicate with and gather information from specific environment components 110, 114, and 118, respectively. In some instances, more than one adapter can be used to discover a given environment component or data object. For example, information discovered by one adapter can be used by a second adapter to drive further discovery.

In order to classify the environment components 110, 114 and 118, the environment classification module 108 first identifies the environment components compiled by the environment discovery module 106. The environment classification module 108 analyzes the system environment data 106 in order to identify the service level capabilities of the environment components 110, 114 and 118. As described previously, the service level capabilities include the service areas and service levels that each of the environment components 110, 114 and 118 is able to provide to the data objects and other environment components located within the computer system 100.

The environment classification module 108 can then classify the environment components based on their service level capabilities. For example, a first backup server may provide a particular class of information protection service, such as daily backups, and a second backup server may provide a different class of information protection service, such as continuous data protection (CDP).

In one embodiment, storage locations are classified based on the service levels that can be provided to the data objects stored at each of the storage locations. In some instances, the services that can be provided to data objects are location-dependant. In other words, the services that are available in a computer system can often only be performed if a data object is located at a specific location. In another embodiment, storage locations are classified based on the data protection services that the storage location requires in order to provide sufficient protection to the data objects it contains. In another embodiment, environment components are classified based on the locations within the computer system that the service applications are capable of providing services to.

c. Service Level Mapping

Once the system environment and the data objects residing in the system have been discovered and classified, the service level mapping module 126 can perform the tasks of selecting service level objectives for each data object and selecting service packages and service providers that are capable of providing the service level objectives.

Figure 2:
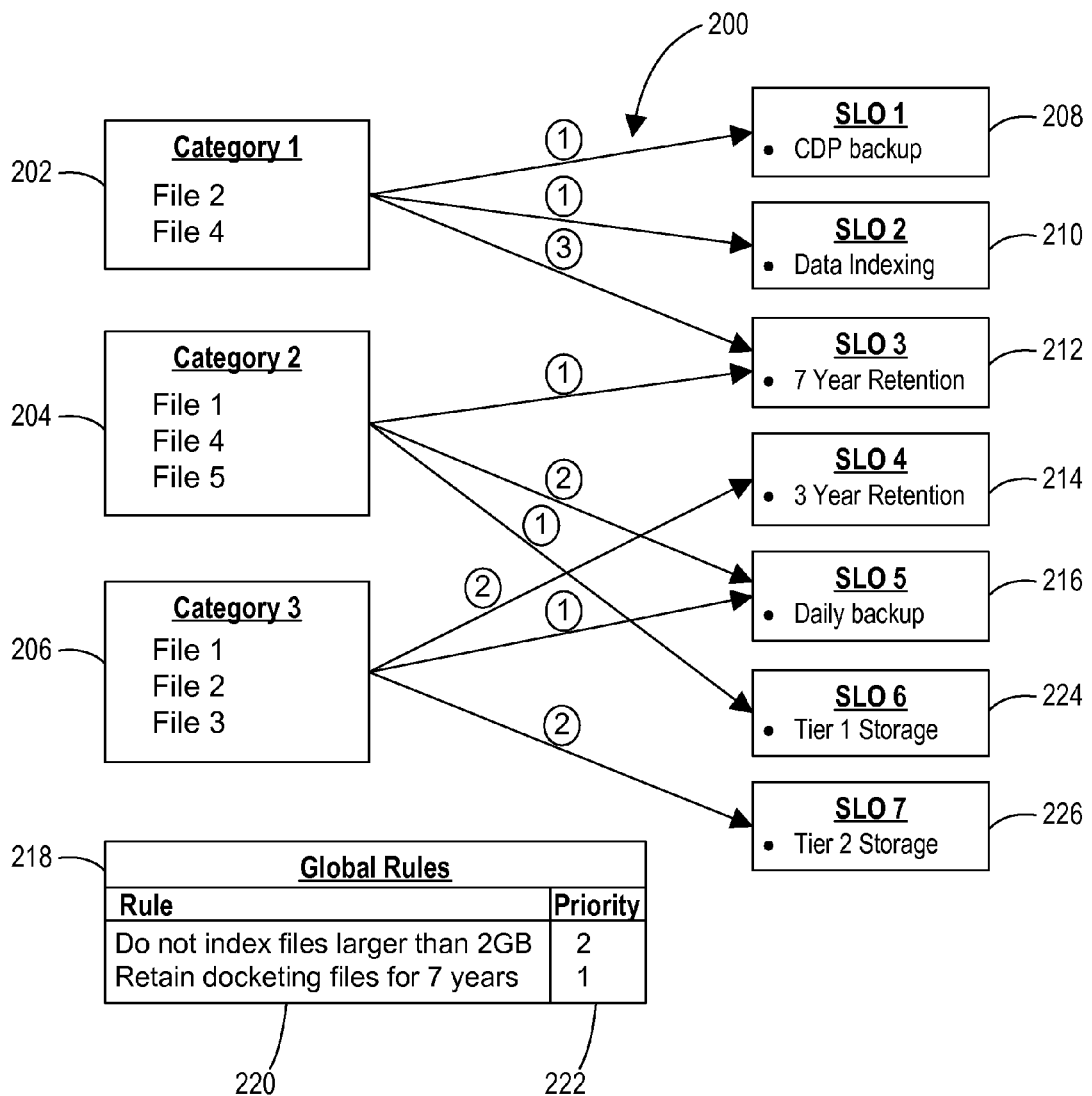
FIG. 2 illustrates an exemplary service level mapping of categories to service level objectives, in accordance with the present invention.

FIG. 2 provides an illustration of an exemplary service level mapping scheme 200 that may be employed by the service level mapping module 126 for matching each data object (i.e., Files 1-5) to the appropriate service level objectives (i.e., Service level objectives 1-7). As illustrated in FIG. 2, the files may be categorized into Categories 1-3 (202, 204 and 206), in accordance with properties associated with the files and/or based on rules including owner defined rules. By way of example, the first category 202 may include files that originated from a division within a company, such as accounting. The second category 204 may include files that exceed two gigabytes in size. The third category 206 may include files whose content includes private information, such as the social security numbers of customers of the company. The categorization of the files into the categories 202, 204 and 206 may be performed by the information discovery and classification module 122, as described previously.

A variety of different service level objectives may be offered to the files contained within the categories 202, 204 and 206. By way of example, the service level objectives that may be offered to the categories 202, 204 and 206 may include CDP backup 208, where every change to the data object is recorded in the CDP engine, data indexing 210, where the content of each file is indexed, seven year retention 212, where the data is stored for at least seven years prior to deletion, three year retention 214, where the data is stored for least three years prior to deletion, daily backup 216, where the files are stored to a backup location on a daily basis, tier 1 storage 224, tier 2 storage 226, and the like. As will be appreciated by one of ordinary skill in the art, many other service level objectives may be offered in addition to those illustrated in FIG. 2.

After assessing the categories 202, 204 and 206 and the available service level objectives 208, 210, 212, 214, 216, 224 and 226, the service level mapping module 126 maps each of the categories to one or more service level objectives for defining the types of services that will be requested by each category. The mappings are depicted by the arrows drawn from the categories 202, 204 and 206 to the service level objectives 208, 210, 212, 214, 216, 224 and 226. For example, Category 1 (202) is mapped to the CDP backup 208, data indexing 210 and seven year retention 212 service level objectives. Category 2 (204) is mapped to the seven year retention 212, daily backup 216 and tier 1 storage 224 service level objectives. Category 3 (206) is mapped to the three year retention 214, daily backup 216 and tier 2 storage 226 service level objectives. The generated service level mappings between the categories 202, 204 and 206 and the service level objectives 208, 210, 212, 214, 216, 224 and 226 may be stored, for example, in the form of metadata, in the mapping data structure 128.

As illustrated in FIG. 2, a single file may be included in multiple categories. For example, 'File 1' is included both in Category 2 (204) and in Category 3 (206). Therefore, 'File 1' will receive the services requested by both Category 2 (204) and by Category 3 (206). Because conflicts may arise when a file is included in multiple categories, the mappings from the categories to the service level objectives may be prioritized in order to resolve any conflicts that may arise, as is described in further detail below.

In one embodiment, priorities may be assigned to each of the service level mappings between the categories 202, 204 and 206 and the service level objectives 208, 210, 212, 214, 216, 224 and 226. The priorities may be used in order to resolve any conflicts that may arise between the various service level objectives that may be requested by a single file. In the example illustrated in FIG. 2, the priority levels are positioned adjacent to the arrows representing the service level mappings from the categories 202, 204 and 206 to the service level objectives 208, 210, 212, 214, 216, 224 and 226.

Figure 3:
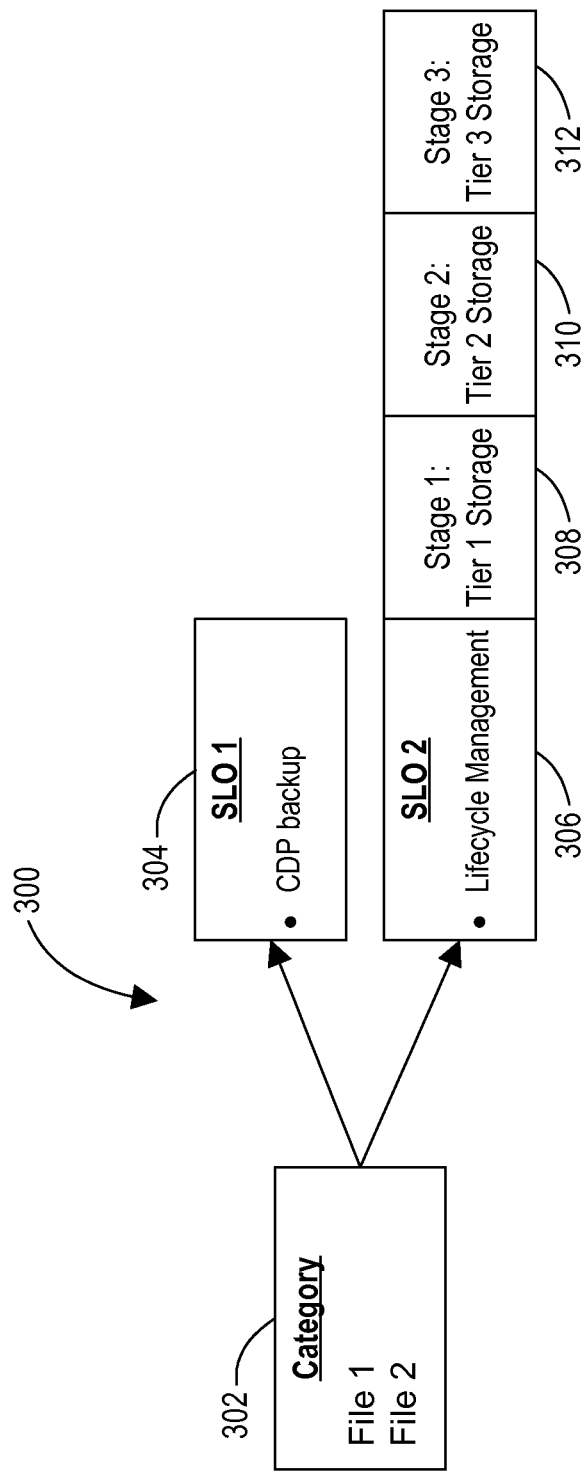
FIG. 3 illustrates an exemplary service level mapping where a category is mapped to a lifecycle management service, in accordance with the present invention.

FIG. 3 is another exemplary illustration of a service level mapping scheme 300 where the category 302 is mapped to a lifecycle management service level 306. The data object or category may be mapped to the lifecycle management service level 306 when the storage location of the data objects is dependent on aging properties associated with those data objects. When a data object or category is mapped to the lifecycle management service level 306, the aging properties of the data object are analyzed prior to selecting the actual service level that will be applied to the data objects. The aging properties that may be analyzed may include any property that may be relevant to the determination of the service level that should be applied to that file, including but not limited to, the amount of time since the data object was created, the amount of time since the data object was last accessed, the amount of time since the data object was last modified, the frequency at which the data object is accessed or modified, and the like and combinations thereof.

Figure 4:
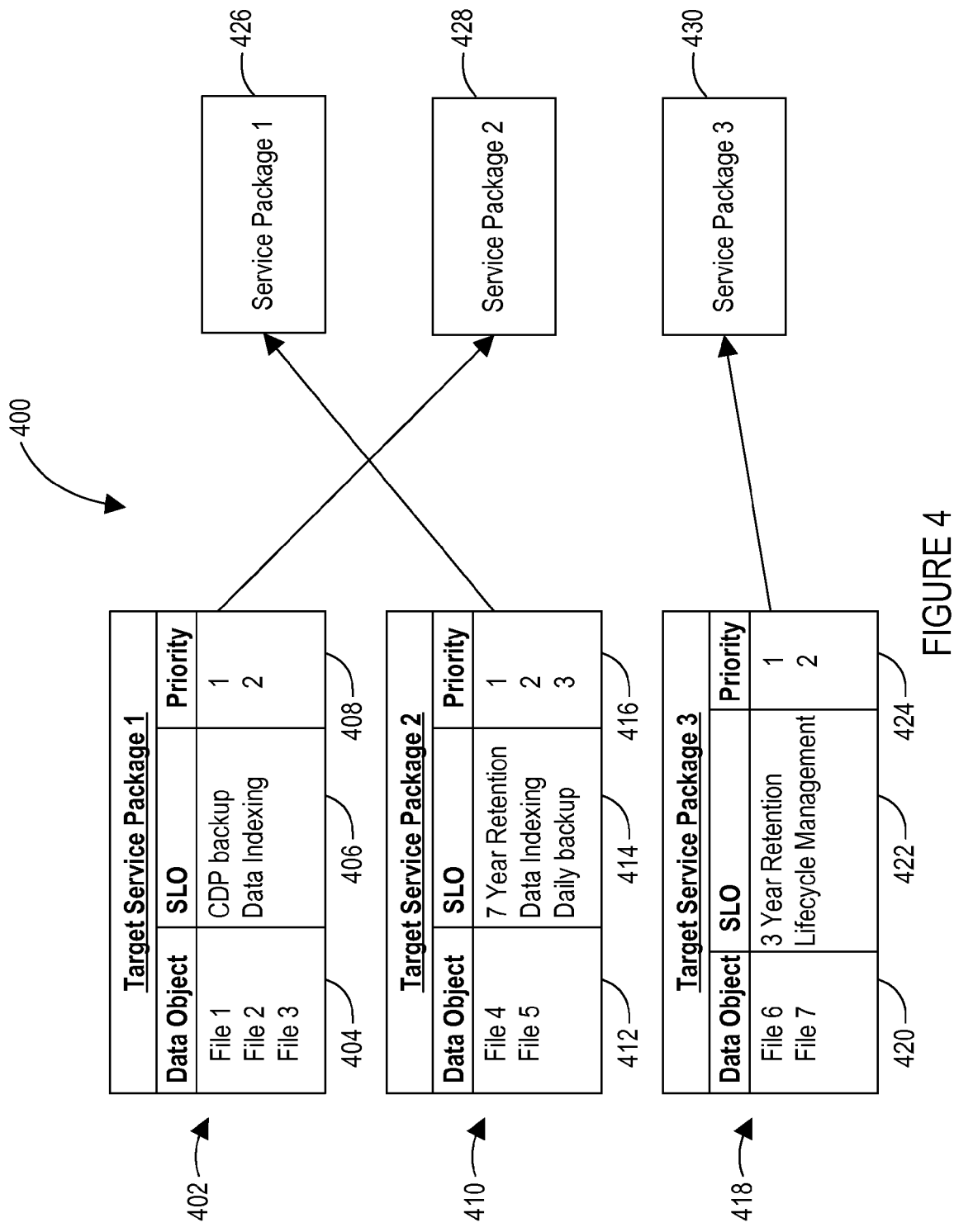
FIGS. 4 and 5 illustrate exemplary mappings of service packages to service providers that are capable of providing the requested service level objectives, in accordance with the present invention.

After performing service level mapping to select the service level objectives for each category 202, 204 and 206, as illustrated in FIG. 2, the service level mapping module 126 maps each of the target service packages to one or more service packages offered by the data center that are most capable of providing the service level objectives contained in the target service packages, as illustrated in FIG. 4. FIG. 4 consists of "target service packages" 402, 410 and 418 on the left and "service packages" 426, 428 and 430 on the right. The "target service packages" 402, 410 and 418 consist of groups of files 404, 412, and 420 that have requests common service level objectives 406, 414 and 422. The "service packages" 426, 428 and 430 consist of the actual bundles of services that are offered by a data center. In some embodiments, the "service packages" provided by a data center may not be able to provide every combination of service level objectives contained in the "target service packages", due to the limited number of "service packages" provided by the data center. FIG. 4 illustrates an exemplary mapping of the target service packages 402, 410 and 418 to a service provider 426, 428 and 430 that is most capable of providing the service level objectives 406, 414 and 422 contained within the target service packages.

Each target service package 402, 410 and 418 may be associated with multiple files, wherein all files contained within a single service package have requested the same group of service level objectives 406, 414 and 422. For example, the target service package 402 includes 'File 1', 'File 2' and 'File 3' (404), each of which has requested CDP backup and data indexing 406. The service level objectives 406, 414 and 422 included within each of the target service packages 402, 410 and 418, respectively, are provided by way of example, and do not necessarily reflect the service level mappings 200 illustrated in FIG. 2.

The service packages 426, 428 and 430 may include a bundle of services offered by one or more environment components to the data objects stored within the computer system. The number of service packages 426, 428 and 430 and the combination of services they each provide may be determined by a data center that specializes in information management services. The services contained in each of the service packages 426, 428 and 430 illustrated in FIG. 4 may be provided by multiple environment components that, taken together, are capable of providing all of the service is included within a service package.

The service level mapping module 126 maps each target service package 402, 410 and 418 to one or more service packages 426, 428 and 430 that are best able to provide the service level objectives 406, 414 and 422 of each of the service packages. In one embodiment, the service providers that provide the services offered in the service packages 426, 428 and 430 include environment components that have been classified in accordance with the environment classification techniques provided by the environment discovery and classification module 104 of FIG. 1.

In one embodiment, the service packages 426, 428 and 430 offered by the data center are sufficient in number to provide any combination of service level objectives 406, 414 and 422 that may exist. In this case, the step of mapping target service packages 402, 410 and 418 to the offered service packages 426, 428 and 430 may be unnecessary, and the target service packages may be mapped directly to the service providers capable of providing the necessary service level objectives 406, 414 and 422. However, in another embodiment, only a finite number of service packages 426, 428 and 430 are offered by the data center. Therefore, in some circumstances, the service packages 426, 428 and 430 offered by the data center may not be able to provide every combination of service level objectives 406, 414 and 422 contained in the target service packages 402, 410 and 418. In this embodiment, user configurable logic may be employed for determining which of the service level objectives 406, 414, and 422 to retain in the event that the data center has elected not to offer service bundles that exactly match the target service packages 402, 410 and 418.

For example, priority levels 408, 416 and 424 may be assigned to each of the service level objectives 406, 414 and 422, respectively. When no service package is available that it is capable providing all the service level objectives 406, 414 or 422 of a target service package 404, 410 or 418, the service package that is able to provide the service level objectives having the highest priority levels is identified. Alternatively, multiple service packages 426, 4428 and 430 may be identified, wherein the combination of the service packages is capable of providing the service level objectives having the highest priority levels.

Figure 5:
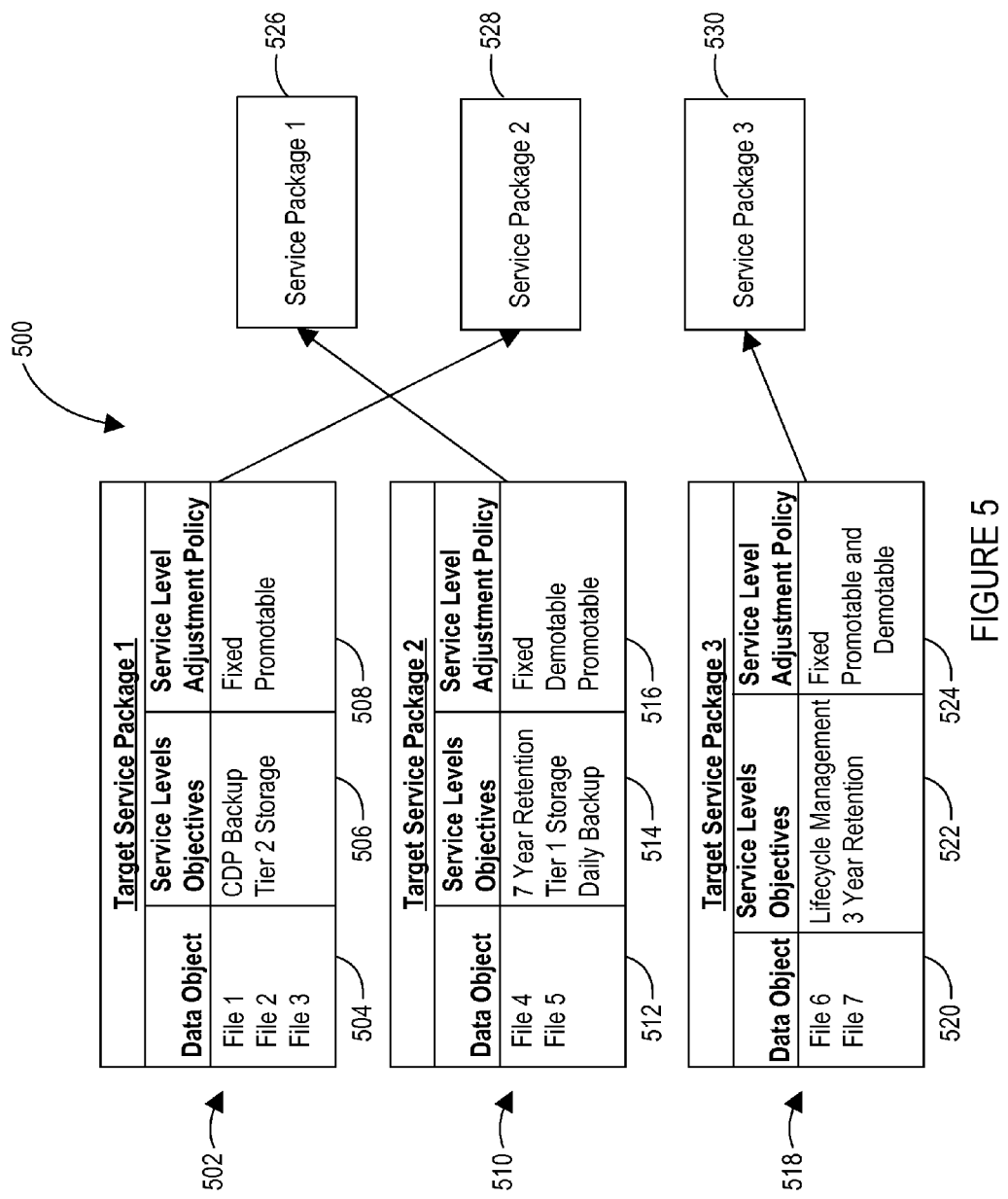

FIG. 5 illustrates another technique that may be employed for matching target service packages 502, 510 and 518 to service packages 526, 528 and 530 when a service package cannot be found that is capable of providing all the service level objectives 506, 514 and 522 of the target service packages. The FIG. 5 example uses service level adjustment policies 508, 516 and 524 to adapt the service level objectives 506, 514 and 522 in the event that the service packages 526, 528 and 530 are unable to provide all of the original service level objectives. By way of example, the service level adjustment policies 508, 516 and 524 may be selected from the following options: 1) a fixed option, wherein the service level objective cannot changed, or in other words, the service level objective must be provided regardless of whether the other service level objectives are met; 2) a promotable option, wherein the service level objective can be changed to a higher level if the requested service level objective is not available;

and 3) a demotable option, wherein the service level objective can be changed to a lower level if the requested service level objective is not available. If a requested service level objective is not particularly important, i.e., other service level objectives within the same service area may also suffice, options two and three may both be selected, such that the priority level may be promoted and demoted.

By way of example, the service level objectives 506 of target service package 1 (502) include CDP backup and tier 2 storage. The service level adjustment policies 508 associated with the service level objectives 506 include a 'fixed' requirement for CDP backup and a promotable option for the tier 2 storage service level objective. Therefore, if none of the service packages 526, 528 and 530 provide CDP backup and tier 2 storage, but service package 2 (528) provides CDP backup and tier 1 storage, the original request for tier 2 storage is promoted to tier 1 storage, and the target service package 1 (502) may be mapped to service package 2. As illustrated in the target service package 3 (518) service level adjustment policies 524, the '3 year retention' service level objective is both promotable and demotable. Therefore, by way of example, instead of requiring three year retention service, the data objects 520 within target service package 3 (518) may instead request one year retention or seven year retention if three year retention is not provided in combination with the other service level objectives 522.

2. Auction Based Service Selection

Figure 6:
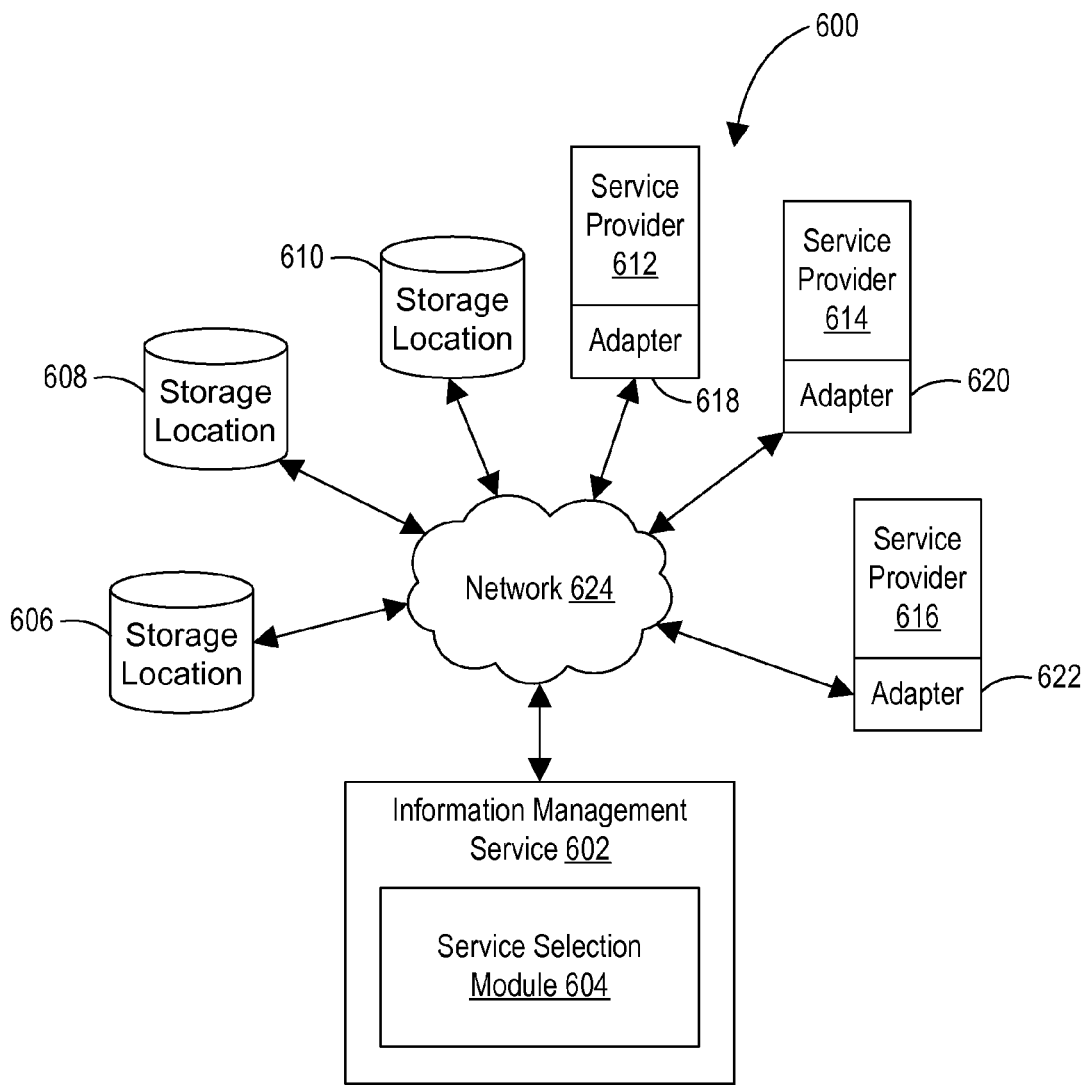
FIG. 6 illustrates a computer system for performing auction based service selection.

As described previously, it may be difficult to find service providers that are capable of providing all of the service level objectives of a data object or category. Furthermore, some service providers may only be capable of providing services to data objects located in certain storage locations or may only provide services to certain data objects for other reasons. FIG. 6 illustrates an information management service 602 having a service selection module 604 capable of performing auction based service selection for selecting the service provider 612, 614 and/or 616 that is capable of providing the requested service level objectives, and for selecting a storage location 606, 608 or 610 that is best to situated for storing the data object.

The service selection module 604 initiates auction based service selection by sending a service request to each of the service providers 612, 614 and 616 to inquire as to whether the service providers are able to provide the service level objectives for a data object or category containing data objects that share the same service level objectives. The service request may include the service package containing each of the service level objectives associated with the data object.

In one embodiment, the service selection module 604 employs adapters 618, 620 and 622 for interfacing with the service providers 612 614 and 616. The adapters of 618, 620 and 622 may provide a layer of abstraction between the information management service 602 and the service providers 612, 614 and 616 for allowing the information management service 602 to communicate with the service provider without being required to use different communication protocols for each service provider. The adapters and 618, 620 and 622 may further provide information relating to each of the service provider 612, 614 and 616 regarding the service level capabilities of each of the service providers, and other properties that may be useful to the information management service 602. The adapters may further be associated with the service 602 rather than associated with the service providers.

Upon receiving the service request from the service selection module 604, each of the service providers 612, 614 and 616 and/or the adapters 618, 620 and 622 may analyze the service request in order to determine if the service providers are capable of providing the service level objectives. The service provider 612, 614 and 616 and/or the adapters 618, 620 and 622 may then provide a response to the service selection module 604 containing information regarding which service level objectives the service providers are capable of providing.

In one embodiment, the service request sent by the service selection module 604 to the service providers 612, 614 and 616 may also include a list of potential storage locations 606, 608 and 610 wherein the data objects may be stored. The service providers 612, 614 and 616 and/or the adapters in 618, 620 and 622 may analyze the service request received from the service selection module 604 in light of the potential storage locations 606, 608 and 610. In some circumstances, the service providers 612, 614 and 616 may only be capable of providing services to data objects located in certain storage locations due to network configuration limitations, conflicting communication protocols, user-defined preferences, and the like. Therefore, the service providers 612, 614 and 616 may elect one or more of the storage locations wherein the service provider prefers the data object be stored. The response provided by the service providers 612, 614 and 616 may include the election of one or more of the storage locations 606, 608 and 610. The election specifies which of the storage locations 606, 608 and/or 610 the data objects must be stored in order for the service provider 612, 614 and 616 to provide one or more of the service level objectives.

After receiving the responses from the adapters 618, 620 and 622 or directly from the service providers 612, 614, and 616, the service selection module 604 selects one or more of the service providers 612, 614 and/or 616 that are best able to provide the service level objectives for the data object or category. The service selection module 604 may further determine which of the potential storage locations 606, 608 or 610 the data object or category should be stored in.

In some systems, it may be possible that no service provider 612, 614, and 616 is able to provide all of the requested service level objectives. In one embodiment, when the service providers 612, 614, and 616 respond to the service request, the response may include additional detail regarding which of the service level objectives the service provider is able to meet. The service selection module 604 can analyze each of the responses from the service providers 612, 614, and 616 and select the provider that is best meets the service level objectives. For example, the service provider 612, 614, or 616 can be selected that is capable of providing the greatest number of service level objectives, or alternatively, that is capable of providing the service level objectives having the highest priorities. The service selection module 604 may then provide a reporting on the service level objectives that could not be met. Alternatively, a user's preferences may specify that no action will be taken when some of the service level objectives cannot be met.

In some situations, the service selection module 604 may receive affirmative responses from multiple service providers 612, 614, and/or 616, each offering to provide the service level objectives. In one embodiment, in order to select which of the available service providers 612, 614, or 616 will provide the requested services, the responses provided by the service providers also include a measure of confidence. The measure of confidence provided by the service level providers 612, 614, or 616 may reflect the service providers' degree of ability to provide the requested service level objectives.

The measure of confidence may depend on a number of factors, such as a likelihood of successfully providing a requested service, the number of service level objectives the service provider 612, 614, or 616 is able to provide in relation to the number of service level objectives requested, the suitability of a storage location for the data object(s) associated with the service level objectives, and the like and combinations thereof.

For example, assume that service provider 612 is a first backup server and service provider 614 is a second backup server. After receiving a service request from the service selection module 604, both the first and second backup servers 612 and 614 provide responses indicating an ability to backup a given file on the desired schedule. However, the first backup server 612 is already assigned many other backup tasks in the desired time slot making it difficult to complete additional backup activities in the time window. Therefore, the first backup server 612 provides a response indicating that it is able to deliver the service but with a low measure of confidence. The second backup server 614 may find that it has little or no backup tasks scheduled in the time window, and therefore responds with a high measure of confidence. The service selection module 604 can use the measures of confidence to pick the second backup server to provide the service level objective.

In another example, assume that service provider 616 is a data mover that is capable of moving data to the storage locations 606, 608 and 610. The data mover 616 may receive a service request from the service selection module 604 to move a particular file to a storage location that is capable of providing one or more service level objectives. The data mover 616 determines that it is capable of moving the particular file to either the storage location 606 or the storage location 608, both of which will deliver the requested service level objectives. The first location 606 is nearly filled to capacity and the second location 608 has a large amount of free space. When bidding on the possible move to the first location 606 the data mover 616 can indicate a low measure of confidence, and when bidding on the possible move to the second location 608, the mover can indicate a higher measure of confidence. Based on these measures of confidence, the service selection module 604 can choose the move the file to the second location 608 and achieve better balance between the two locations 606 and 608.

Figure 7:
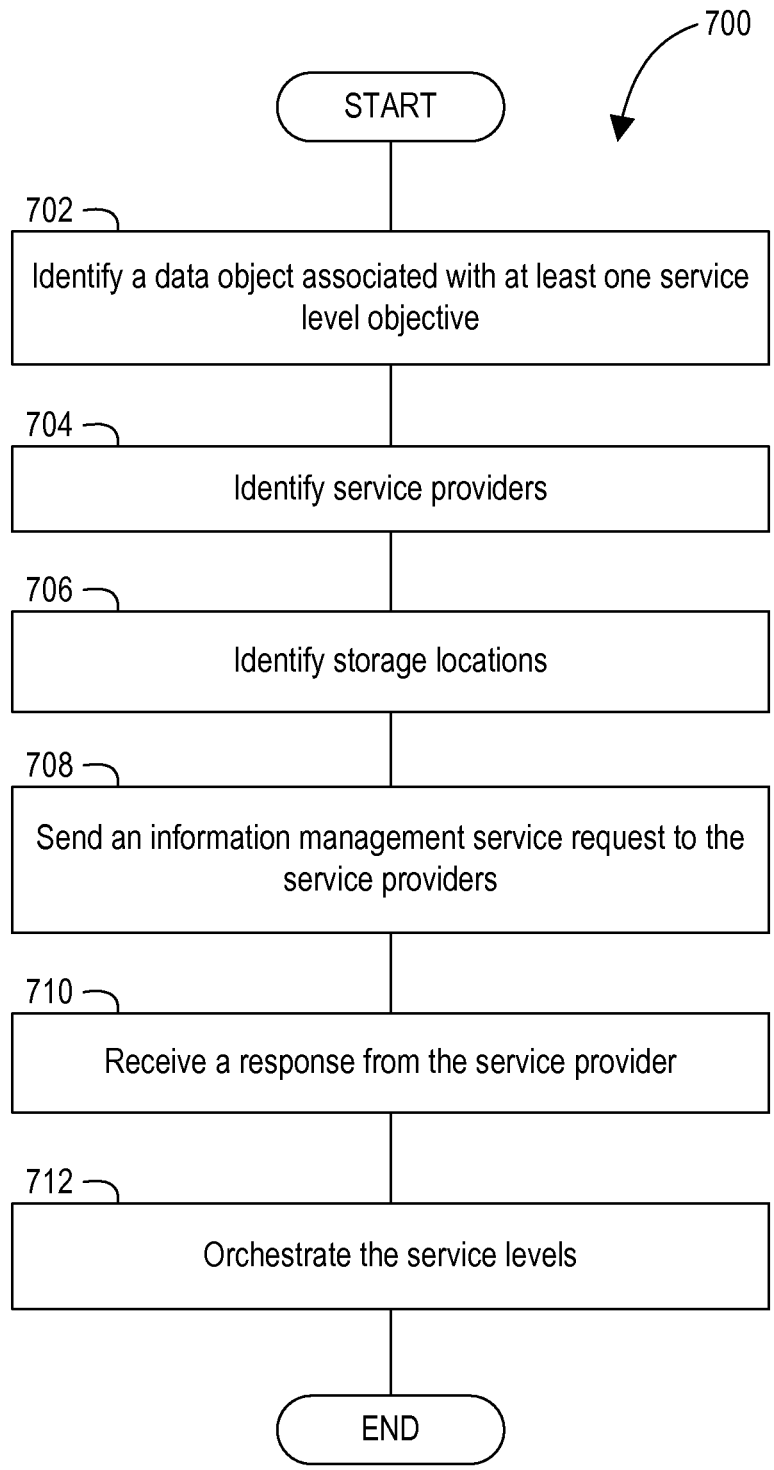
FIGS. 7 and 8 illustrate flow diagrams of a method for locating a service provider capable providing service level objectives for a data object.

FIG. 7 illustrates one embodiment of a method 700 of locating a service provider capable of providing service level objectives for a data object. The method 700 may be practiced, for example, in a computer system that includes an information management service for providing customized services to the data objects residing in the computer system. The method identifies 702 a data object associated with at least one service level objective. The service level objectives define service level objectives requested by the data object. Referring once again to FIG. 2, an illustrative example of a service level mapping scheme is provided for associating data objects with at least one service level objective.

In one embodiment, identifying 702 a data object associated with at least one service level objective may include identifying a category containing multiple data objects that are each associated with a common group of service level objectives.

Referring once again to FIG. 7, at least one service provider is identified 704 that may be capable of providing one or more of the service level objectives for the data object. The method 700 may further include identifying 706 at least one potential storage location wherein the data object can be stored. In one embodiment, identifying the potential storage locations may further include eliminating all storage locations that do not support the bundle of service level objectives. In other words, the list of potential storage locations may be condensed to only those storage locations that are known to support the service level objectives requested by the data object so the time is not wasted analyzing storage locations that are known to be incapable of supporting the appropriate bundle of services.

An information management service request is then sent 708 to the service providers. The information management service request contains the service level objectives (i.e., the service package) associated with the data object. In one embodiment, the information management service request further includes the potential storage locations.

In one embodiment, the information management service request is sent to an adapter, which is configured to provide a layer of abstraction between the information management service and the at least one service provider. For example, as illustrated in FIG. 6, each of the adapters 618, 620 and 622 may be programmed with an understanding of what services each service provider 612, 614 and 616 is able to perform, and to which locations 606, 608 and 610 the service providers are capable of providing services. The adapters 618, 620 and 622 may further be programmed to allow the service selection module 604 to communicate with all the adapters using a common communication protocol.

Referring again to FIG. 7, responses are received 710 from the service providers. The responses include which of the service level objectives the service providers are capable of providing. The responses may further include storage location identifiers for identifying which of the potential storage locations the service providers are capable of providing the services to. For example, and referring again to FIG. 6, the service provider 616 may provide data indexing, among other services. The service selection module 604 sends an information management request to the service providers 612, 614 and 616. The information management request may include one or more service level objectives associated with a file, including, for example, a request that the file be indexed by a data indexer. Upon receiving the information management request, the service provider 616 and/or the adapter 622 may determine that in order for the service provider 616 to perform data indexing of the file, the file must be stored in the storage location 608. Therefore, the response provided by the service provider 616 and/or the adapter 622 may state that the service provider 616 is capable of performing the date indexing service level objective, on the condition that the file be stored in the storage location 608.

In one embodiment, the adapters employed in the method 700 are further configured to communicate with one another. For example, as illustrated in FIG. 6, each adapter 618, 620 and 622 may communicate with the other adapters to gather additional information and incorporate the information into the response provided to the service selection module 604. For instance, each adapter 618, 620 and 622 may gather information regarding which of the potential storage locations 606, 608 and 610 the other adapters have elected to store the data object. After gathering this information, each adapter can make a determination as to if its ability to provide services might be affected by the storage location elections of the other adapters. When providing a response to the service selection module 604, the response may further include information regarding the adapter's ability to provide the service level objectives in light of the storage location elections of the other adapters and 618, 620 and 622.

For example, if the service provider 614 elects to store a file in the storage location 606, while a service provider 616 can only provide services to file stored in the stores location 608, of response provided by the service provider 616 may include a provision that the election suggested by the service provider 614 will preclude it from providing one or more services.

The method 700 may also include selecting one or more of the service providers to perform the service level objectives. Further, the method 700 may also include selecting one of the potential storage locations to store the data object. The method 700 may also include assigning a priority level to each of the service level objectives in accordance with which of the service level objectives are deemed to be most important to the data object. When selecting the service providers for performing the service level objectives, the service providers that are most capable of providing the service level objectives having the highest priority levels may be selected.

After the service providers and storage locations have been selected, the method 700 may orchestrate 712 the service level objectives by submitting an orchestration request to the selected service providers. In one embodiment, the orchestration requests may be submitted to the selected service providers via the adapters described above.

Figure 8:
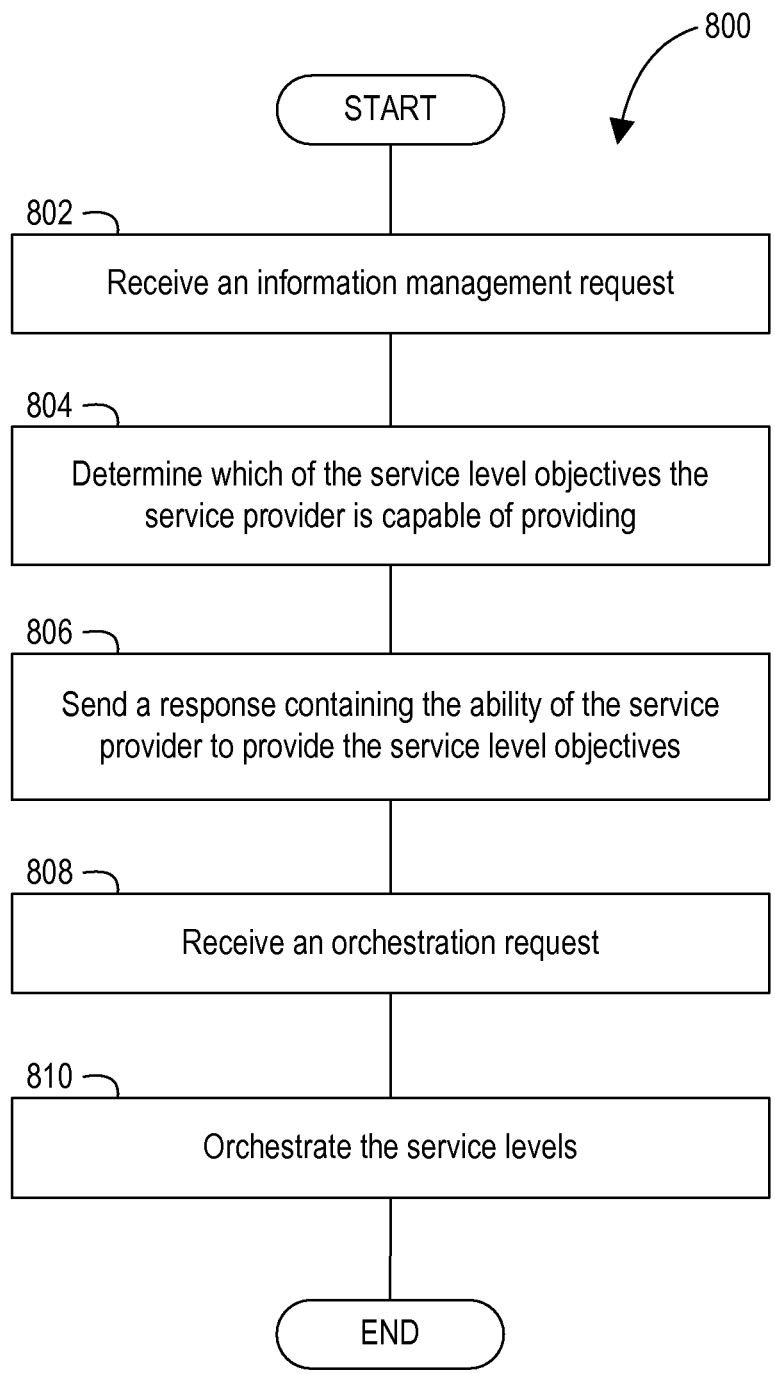

Referring now to FIG. 8, a method 800 is illustrated of locating a service provider capable of providing service level objectives for a data object. The method 800 may be practiced, for example, in a computer system that includes an information management service for providing customized services to data objects residing in the computer system. The computer system may include service providers for providing information management services to data objects stored within the system. Each service provider may be associated with an adapter configured to interface between the information management service and the service provider The server system may include one or more computer-readable media having computer-executable instructions, that when executed, implement the method 800.

An adapter receives 802 an information management request containing at least one service level objective for defining services requested by a data object. The information management service request may further include at least one potential storage location for the data object.

The adapter determines 804 which of the service level objectives the service provider associated with the adapter is capable of providing. The adapter may further determine which of the potential locations can store the data object in order for the service provider associated with the adapter to provide one or more of the service level objectives.

The adapter then sends 806 a response to the information management service indicating the ability of the service provider to provide at least one information management request. The response may further include at least one storage location identifier for identifying which of the at least one potential storage locations the service provider is capable of providing services to.

The adapter may further receive 808 an orchestration request for one or more of the service level objectives. Upon receiving the request, the adapter may orchestrate 810 the service level objectives by performing the requested services for the data object(s). In one embodiment, the adapter may utilize one or more Application Programming Interfaces (API) to orchestrating the service level objectives.

Embodiments herein may comprise a special purpose or general-purpose computer including various computer hardware. Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computer system that includes an information management server configured to orchestrate provision of customized services to a plurality of data objects residing in the computer system, a method for locating a service provider that provides the customized services to the plurality of data objects, the method comprising:

evaluating each of the plurality of data objects individually so as to identify, at the data object level, a respective service level objective for each of the plurality of data objects, each service level objective defining a service and a level of the service suggested for the associated data object, wherein the service level objective customizes the services for the associated data object at the individual data object level;

identifying a plurality of service providers, where each of the service providers is operable to provide services to one or more data objects at various levels of the services;

sending an information management service request to each of the plurality of different service providers, the information management service request containing a plurality of service level objectives associated with the plurality of data objects;

receiving a response from each of the service providers, wherein each response identifies which of the plurality of service level objectives the corresponding service provider is capable of providing; and selecting one or more of the service providers from the plurality of service providers based on the received responses by determining which service providers can best satisfy the plurality of service level objectives based on a measure of confidence included in each of the received responses that reflects a degree of ability to provide the service level objectives, wherein the selected service providers provide services to each data object based on the service level objectives of each data object, wherein each of the data objects receives customized services according to its service level objectives from one or more of the selected service providers.

2. The method as recited in claim 1, further comprising:
identifying a plurality of potential storage locations wherein the data objects can be stored;
wherein the information management service request further includes the potential storage locations, and wherein the response further includes a storage location identifier for identifying which of the potential storage locations one of the service providers is capable of providing services to.

3. The method as recited in claim 2, wherein identifying potential storage locations wherein the data objects can be stored further comprises:
eliminating storage locations that do not support one or more of the service level objectives from the potential storage locations.

4. The method as recited in claim 2, wherein the response further includes a ranking of each of the potential storage locations.

5. The method as recited in claim 2, further comprising:
selecting one of the potential storage locations in which to store the data objects.

6. The method as recited in claim 2, wherein sending an information management service request to the plurality of service providers and receiving a response from the plurality of services provider further comprises communicating directly with adapters, each adapter configured to provide a layer of abstraction between the information management service and a corresponding service provider.

7. The method as recited in claim 6, wherein the adapters are further configured to communicate with one another, and wherein the responses from each of the adapters are based on information gathered from each of the other adapters.

8. The method as recited in claim 7, wherein the response from each of the service providers further includes information regarding the service providers' ability to provide the service level objectives in the event that the storage location identifiers of the other service providers are selected as the storage location for the data object.

9. The method as recited in claim 1, further comprising:
selecting one or more of the plurality of service providers to perform one or more of the service level objectives.

10. The method as recited in claim 9, further comprising:
orchestrating provision of one or more of the service level objectives by submitting an orchestration request to the selected one or more service providers via adapters configured for communicating with each of the service providers.

11. The method as recited in claim 9, further comprising:
assigning a priority level to each of the service level objectives that the data objects are associated with; and
wherein selecting one or more of the service providers to perform one or more of the service level objectives further comprises:
selecting one or more of the service providers that is capable of providing the service level objectives having the highest priority levels.

12. The method as recited in claim 9, wherein selecting one or more of the service providers to perform one or more of the service level objectives further comprises selecting the service provider indicating the highest measure of confidence.

13. The method as recited in claim 1, wherein the services provided to a data object include one or more of data backup, data retention, data indexing, data lifecycle management, data placement, data protection, data security, and data migration.

14. In a computer system that includes an information management server configured to orchestrate provision of customized services to data objects residing in the computer system, the computer system comprising a service provider, each service provider associated with an adapter configured to interface between the information management service and the service provider, a method for locating a service provider capable of providing services identified by service level objectives for each of the data objects, the method comprising:
receiving, at an adapter associated with a service provider, an information management request comprising an inquiry as to whether or not the service provider is able to provide a service level objective for a category containing data objects that share a service level objective, the service level objective defining services to be provided for at least some of the data objects and a level of the services, and wherein the service level objective is customized for each of the data objects at the individual data object level;
determining which service level objectives the service provider associated with the adapter is capable of providing; and
sending a response containing information regarding which service level objectives the service provider is capable of providing, wherein the information management server selects the service provider for certain data objects based on the response from the service provider by determining whether the service provider can satisfy the service level objectives better than other service provider, wherein the response includes a measure of confidence reflecting a degree of ability to provide the service level objectives, wherein the service provider performs the services for the certain data objects according to the service level objectives of the certain data objects when selected by the information management server.

15. The method as recited in claim 14, wherein the information management service request further includes a plurality of potential storage locations for the data objects, and wherein the response further includes a storage location identifier identifying which of the potential storage locations the service provider is capable of providing services to.

16. The method as recited in claim 14, further comprising:
receiving at the adapter an orchestration request for one or more of the service level objectives; and
orchestrating the one or more service level objectives.

17. The method as recited in claim 16, wherein orchestrating the one or more service level objectives further comprises:
utilizing an Application Programming Interface for orchestrating the service level objectives.

18. In a computer system that includes an information management server configured to orchestrate provision of customized services to data objects residing in the computer system, a method for locating a service provider capable of providing service level objectives for data objects, the method comprising:
evaluating each of a plurality of the data objects on an individual basis so as to identify, at the data object level, a service level objective for each of the plurality of data objects, each of the service level objectives defining a service for the associated data object and a level of the service, wherein the service level objective is customized for each of the data objects at the individual data object level;
sending an information management service request to a plurality of service providers, the information management request containing a target service package that includes multiple service level objectives associated with a single one of the data objects and potential storage locations for the data objects;

receiving a response from each of the plurality of service providers, wherein each response identifies which of the plurality of services the corresponding service provider is capable of providing and the response also includes a storage location identifier for identifying which of the potential storage locations the service provider is capable of providing the service level objective to; and selecting specific service providers from the plurality of service providers to provide the services defined in the service level objectives, wherein the responses enable the information management server to determine which of the plurality of service provide can best satisfy the information management request based on a measure of confidence included in each of the received responses that reflects a degree of ability to provide the service level objectives, wherein the services are customized for each of the data objects and wherein the selected service providers provide services for each of the data objects according to the service level objectives of the data objects.

19. The method as recited in claim 18, wherein the at least one potential storage location includes storage locations that are predetermined to support the at least one service level objective.

20. The method as recited in claim 18, wherein sending an information management service request to the at least one service provider and receiving a response from the at least one service provider further comprise communicating directly with adapters, each adapter configured to provide a layer of abstraction between the information management service and the at least one service provider.

* * * * *